United States Patent [19]

Ezoe

[11] Patent Number: 5,116,655
[45] Date of Patent: May 26, 1992

[54] PREVENTIVE METHOD AGAINST APPOSITION OF A MARINE ORGANISM AND A PREVENTIVE SHEET AGAINST APPOSITION OF A MARINE ORGANISM

[76] Inventor: Tuguo Ezoe, 2-701, 1 Nagai Higashi 1-chome, Sumiyoshiku, Osaka, Japan

[21] Appl. No.: 385,883

[22] Filed: Jul. 27, 1989

[30] Foreign Application Priority Data

Jul. 28, 1988 [JP] Japan .................. 63-189429
Apr. 17, 1989 [JP] Japan .................. 1-96753

[51] Int. Cl.$^5$ .................. F02B 3/04; B08B 17/00; B32B 3/02; B32B 33/00
[52] U.S. Cl. .................. 428/92; 428/87; 428/95; 405/24; 422/6
[58] Field of Search .................. 428/85, 87, 92, 95; 405/24; 422/6

[56] References Cited

U.S. PATENT DOCUMENTS 4,923,730  5/1990  Taniguchi et al. .................. 428/92

FOREIGN PATENT DOCUMENTS 0120491  9/1981  Japan .
0114194  7/1984  Japan .
0194012  8/1988  Japan .
0293215  11/1988  Japan .................. 405/24
2026039  1/1980  United Kingdom .................. 422/6

*Primary Examiner*—George F. Lesmes
*Assistant Examiner*—Terrel Morris
*Attorney, Agent, or Firm*—Jones, Tullar & Cooper

[57] ABSTRACT

A preventive method against apposition of a marine organism according to which a preventive sheet having white or green fur-like fibers provided to be thick thereon, for example such as a boa cloth obtained by napping the front surface of a polyester cloth, is attached to portions of a structure which is to be brought into contact with sea water, with the fibers facing toward the seawater when the sheet is attached to the structure. The preventive sheet comprises a base member to be attached to the submerged portion of the structure and the fur-like fibers thickly provided on the front surface of the base member so as to be flexible and thereby naturally sway in water. The fur-like fibers may be raised vertically in a straight fashion and may contain an ultraviolet-ray absorbent. The base member may be dotted over with magnetic pieces such as magnets.

8 Claims, 5 Drawing Sheets

PREVENTIVE METHOD AGAINST APPOSITION OF A MARINE ORGANISM AND A PREVENTIVE SHEET AGAINST APPOSITION OF A MARINE ORGANISM

BACKGROUND OF THE INVENTION

1. Field of the Invention

The present invention relates to a preventive method against apposition of a marine organism such as a mussel, an oyster and a barnacle, and to a preventive sheet against apposition of a marine organism, which is adapted to be used by being attached to such as the bottom surfaces and the like of a watercraft, a ship, a structure such as a water suction pipe and a water discharge pipe both submerged in water, a storage tank for crude oil, LPG and so on floating in water, an oil fence, a floating buoy, a marine buoy and so on.

2. Prior Art

Conventionally, in order to reduce the harmful influence of apposition of a shellfish such as a mussel, an oyster and a barnacle on a water suction pipe or a water discharge pipe provided in a structure used below water or in contact with the water and on a bottom surface of a buoy or a ship, various preventive methods have been studied.

One known preventive method against apposition of a shellfish is referred to as "a corrugated copper pipe". This is adapted to generate copper ions in the sea in order to kill larvae of shellfish. There is a problem associated with this method, however, in that the sea water itself becomes polluted with copper ions.

Accordingly, almost always a man dives into the sea to remove the shellfish from the above-mentioned submerged object at the right time when the apposite shellfishes are grown to a fair amount. Since manual removal is laborious and troublesome and the operations of plants and facilities must be stopped during the removal work, the workman is in danger, and operating efficiency is bad.

SUMMARY OF THE INVENTION

The prevent invention is directed to solving the abovementioned problems.

A method according to the present invention provides a safety countermeasure to keep shellfish larvae off of structures by utilizing an ecological and physiological phenomena that shellfish larvae don't attach to a swaying object such as seaweed and algae in the sea, and is characterized in that a furry sheet having mink-like furs provided to be thick thereon is attached to the submerged options of a structure with its furs facing toward the sea water side.

A preventive sheet against apposition of a marine organism according to the prevent invention comprises a base member to be attached to the submerged portion of a structure and fur-like fibers thickly provided on the front surface of the base member so as to be flexible and naturally sway in water.

When manufacturing this preventive sheet against apposition of a marine organism according to the present invention, fiber elements for the base member and fine fibered furs provided on the front surface thereof may be made from different materials respectively, and further the sheet may be formed by raising fine fiber elements from the front surface of the base member by means of a so-called piling process and the like, or it may be formed by rooting fine fiber elements in the front surface of the base member.

It is preferable in consideration of an activation of the sway movements in water that the fur-like fibers provided on the front surface of the base member may be raised substantially vertically in a straight fashion with respect to the base member. Further, in case the preventive sheet is used where the sun's rays are strongly applied, preferably the fur-like fibers may contain an ultraviolet-ray absorbent in order to prevent degradation from being caused by the ultraviolet-rays as well as to improve durability.

Furthermore, in order to facilitate attachment to the structure as well as to improve durability, it is preferable that the base member may have a back coating formed of rubber and the like applied to its back surface.

According to one preferred embodiment, the preventive sheet of the present invention is provided with fiber elements provided on the base member, which are required to be flexible so as to freely sway in water and are about 0.01-0.3 mm in diameter and about 10 mm-30 mm long.

Further, in the case where the preventive sheet is used on the water discharge pipe structure, the base member may be dotted over with magnetic pieces such as magnets so as to simultaneously prevent the production of scales and the apposition of seaweeds on the pipe in addition to the function to rid the pipe of shellfishes owing to the free sway movements of the fibered furs in water. Accordingly, it becomes possible to provide a discharge pipe having an enhanced added value. According to the present invention, since the preventive sheet is provided thickly on the front surface with white or green mink-like furs facing toward the sea water side so that the mink-like furs can move in a swaying manner like seaweeds in water, it is possible to keep off shellfish larvae straying in the sea as well as to prevent the apposition of such larvae thereon.

In the case where a base member is dotted over with magnetic pieces such as magnets, since it becomes possible to prevent the production of scales and the apposition of seaweeds owing to the magnetic force in addition to the function of ridding an object of shellfishes owing to the sway movements of the fur-like fibers in water, the preventive sheet is more advantageous when being applied to a water discharge pipe and the like in water.

The above and other objectives and advantages of the present invention will become more apparent from the following description of the invention with reference to the attached drawings.

BRIEF DESCRIPTION OF THE DRAWINGS

FIG. 2c is a partial enlarged sectional view of the water suction pipe shown in FIG. 2a.

DETAILED DESCRIPTION OF PREFERRED EMBODIMENT

A preferred embodiment of the present invention will be explained with reference to the drawings hereinafter.

Figure 1:
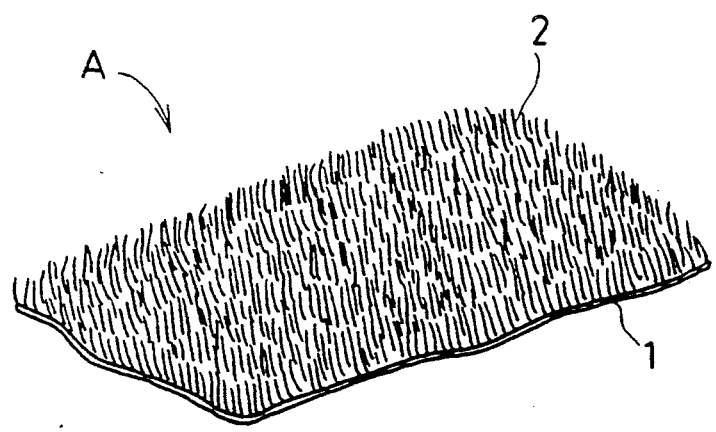
FIG. 1 is a perspective view showing one example of a preventive sheet against apposition of a marine organism of the present invention.
Figure 3:
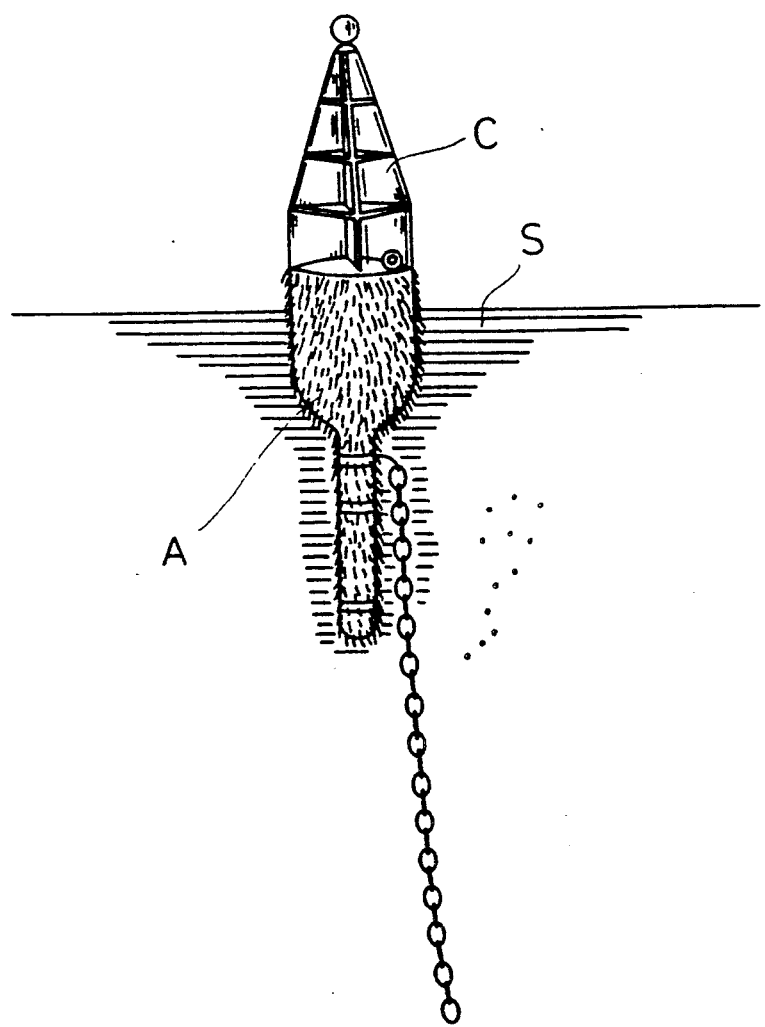
FIG. 3 is an explanatory view showing one example in the case of a marine buoy its bottom surface provided with the preventive sheet.

As shown in FIG. 1, a sheet A of the present invention comprises a base member 1, a large number of flexible fur-like fibers 2 provided to be thick on the front surface thereof and is adapted to be attached at its back surface to a submerged portion of a structure (for example, as shown in FIG. 3) by means of an adhesive and the like. Each of the fur-like fibers 2 has a sufficient length and a sufficient flexibility to freely sway in water when the base member 1 is submerged into the water.

As the sheet A, a cloth made of polyethylene (high-molecular or ultrahigh-molecular) can be employed, or a boa cloth obtained by napping a cloth made of polyester. Especially in the case where durability is required for the cloth, polypropylene is preferably employed.

The fur-like fibers 2 can be formed by napping the front surface of the base member 1 or by rooting the fine fiber elements thickly in the front surface of the base member 1, which elements may be made of different materials from the fiber elements used for the base member 1.

It is preferable in consideration of the facilitation of the swaying movement and the sticking in water that the fur-like fibers 2 napped from the front surface of the base member 1 are about 0.01 –0.5 mm in diameter and about 10–30 mm long. Further, it is preferable that the color of the fiber 2 is green resembling that of seaweed or algae, besides white or gray having a high reflectivity.

Incidentally, the fibers 2 may contain an ultraviolet-ray absorbent. In this case, since the fibers 2 can effectively prevent degradation from being caused by the ultraviolet-ray during exposure to the sun's ray, the durability thereof is further improved when being used in the sea.

On the other hand, when the base member 1 is attached to a structure, besides an ordinary attaching method employing an adhesive, a releasable fastener or a hook (not illustrated) may be used or the base member 1 may be attached thereto after being stitched in a bag shape.

Further, in order to increase the strength of the base member 1, a back coating formed of a rubber membrane such as neoprene rubber may be applied thereto. In case that the back coating is applied, it becomes possible to effectively prevent a reverse penetration of an adhesive toward the front side of the base member 1, and also workability at the time of cutting can be improved.

In order to activate the natural sway movement of the fur-like fibers 2 in water, the fibers 2 are preferably napped in a straight fashion and are preferably about 10–30 mm long, in the case of an ordinary fiber, in consideration of the working efficiency at the time of sticking to the structure.

A concrete example of the preventive sheet according to the prevent invention will now be discussed.

Figure 2B:
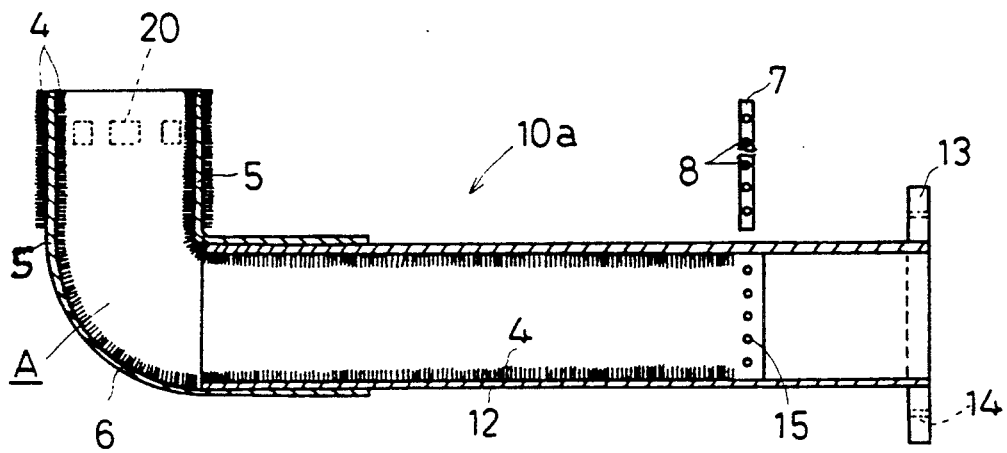
FIG. 2b is a vertical sectional view of an L-shaped portion near the opening of a water suction pipe.
Figure 2A:
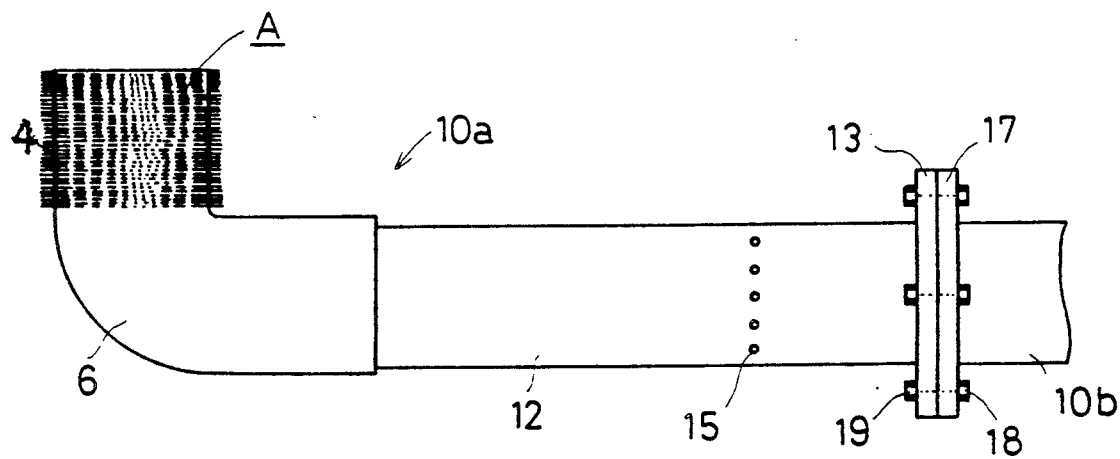
FIG. 2a is a front view showing an outer appearance of a water suction pipe provided with a preventive sheet against apposition of a marine organism thereof.

As shown in FIG. 2a and FIG. 2b, the preventive sheet A is stuck to suitable portions of the inner circumferential surface and the outer circumferential surface of a seawater suction pipe 10, namely stuck throughout the surfaces of the places to which shellfishes are apt to appose.

Though the places to which the shellfish are apt to appose differ depending on the particular structure, the preventive sheet A is stuck to the whole of the inner circumferential wall of the leading portion 10a of the pipe 10 and the outer surface near the opening portion thereof by means of an adhesive applied to the backside of the base sheet 5 with the mink-like furs 4 facing toward the seawater side, in the example shown in FIG. 2a and FIG. 2b.

Even though it is enough to stick such a preventive sheet A only by means of an adhesive, further the end portion thereof on the base portion 10b side of the suction pipe 10 is fixedly secured by means of a fixing belt 7 in the illustrated example.

Figure 2C:
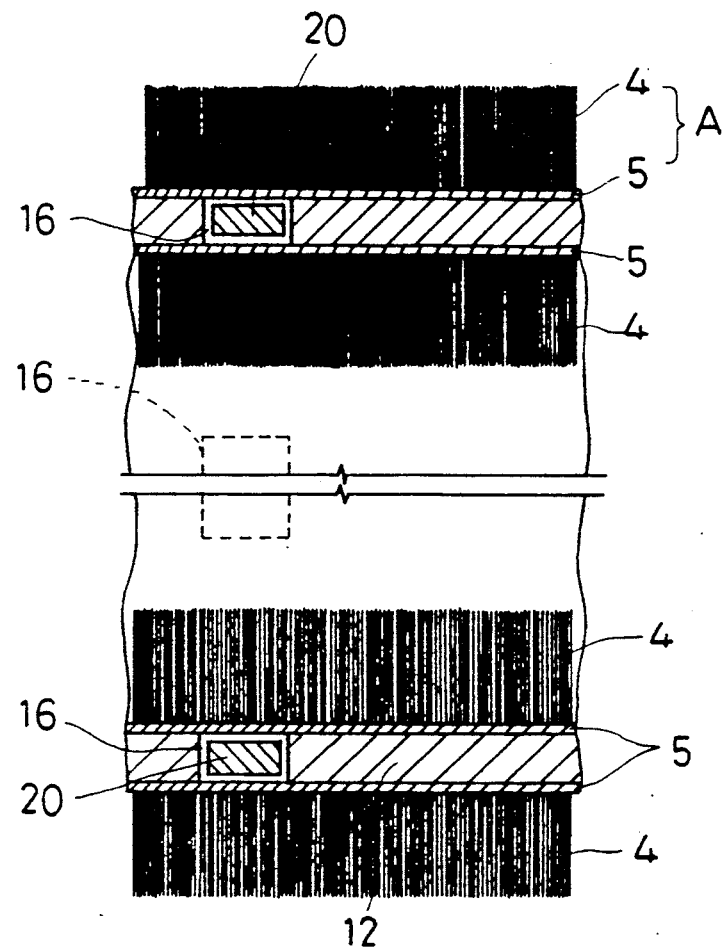
Figure 2D:
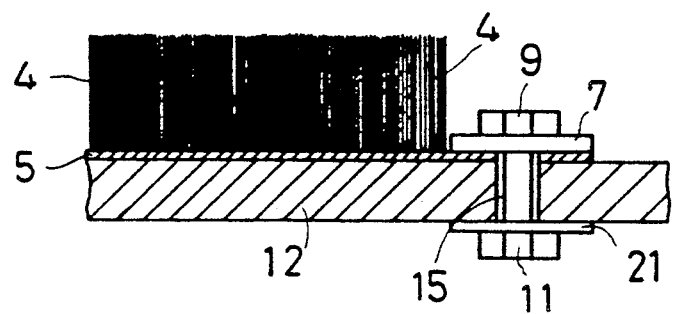
FIG. 2d is a partial enlarged sectional view showing a way of fixing the preventive sheet.

As shown in FIG. 2d, the fixing belt 7 is pressed onto the preventive sheet A along the circumferential direction from the inside of the straight portion 12 of the pipe 10 by tightening the nuts 11 threadably engaged with the bolt 9, which extends through the holes 8 of the belt 7 as well as through the hole 15 formed in the side wall of the straight portion 12, with washers 21 being interposed between the nuts 11 and the side wall of the pipe 10.

The leading portion 10a is provided at its end on the base portion 6 side with a flange 13 having bolt-holes 14 for connecting the leading portion 10a to the base portion 10b.

As the preventive sheet A, a known adequate furred sheet such as a mink-like napped cloth, and a cloth and a sheet both having furs rooted in their front surfaces may be used. But since it may be that such a cloth and sheet are not sufficiently durable, this embodiment employs a boa cloth which is obtained by napping a cloth made of polyester.

The length of the fur 4 is selected depending on the relation to the diameter of the base portion 6 of the suction pipe 10, and is usually several mm or about 1 cm. And the furs 4 are preferably rooted in the front surface of the sheet A substantially in a vertical manner.

A plurality of permanent magnets 20 are embedded in the side wall of the L-shaped portion 6 adjacent to the opening portion. As shown in FIG. 2c, this embodiment employs the permanent magnets 20 fitted in the cut-out portions 16 spaced apart at a suitable interval in the circumferential direction of the L-shaped portion 6. In this case, since the magnetic force is generated near the opening portion, the shellfish larvae hardly enter the water suction pipe 10 so that the apposition of the shellfishes can be more effectively prevented.

As shown in FIG. 2a, the leading portion 10a of the water suction pipe 10 is connected to the base portion 10b thereof provided at its leading end with a flange 17 by tightening the nuts 19 threadably engaged with the bolts 18, which extend through both flanges 13, 17 when they are brought into contact with each other.

As a result of the experiment carried out in the leading portion 10a of the water suction pipe 10 constructed as mentioned above, it is observed that shellfish larvae don't appose and grow at all on the inner surfaces of the straight portion 12 and the L-shaped portion 6 as well as the outer surface of the L-shaped portion 6 both provided with the preventive sheets A.

Accordingly, it can be clearly understood that the apposition of the shellfish to the water suction pipe can be completely prevented when this leading portion 10a is connected to the opening end portion of the base portion 6 of the water suction pipe 10.

According to the above embodiment, after the base sheet 5, thickly provided with the furs 4, is attached to the leading portion 10a of the water suction pipe 10, the leading portion 10a is connected to the base portion 10b previously submerged in the sea in order to facilitate attachment and the replacement of the preventive sheets A. Besides, it is also possible that the preventive sheet A may be directly attached to the portion adjacent to the opening of the water suction pipe 10 previously arranged.

FIG. 3 shows an example in which the preventive sheet A according to the present invention is stuck to the bottom surface of a buoy C floating in the sea. When being stuck to such a structure as the buoy C, the preventive sheet A is stuck to the entire portion thereof to be brought into contact with the seawater S.

Figure 4:
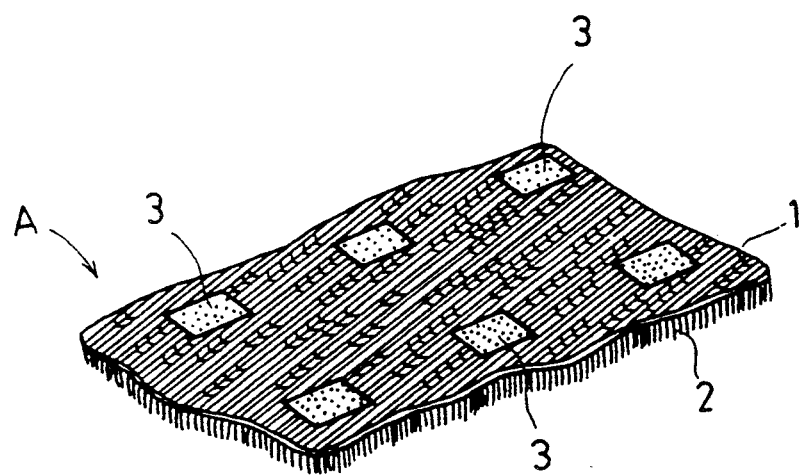
FIG. 4 is a perspective view showing the back surface, dotted over with magnetic pieces, of the preventive sheet against apposition of a marine organism.

FIG. 4 shows one example of the preventive sheet A dotted over with magnetic pieces 3 which are stuck to the backside of the base member and are spaced apart from each other at a suitable interval. It is not always necessary to stick the magnetic pieces 3 onto the surface in contact with the seawater, but they may be attached to the cut-out portions of the structure so as to be held in with the preventive sheet A.

The application of the preventive sheet A according to the present invention is not limited to the above-mentioned ones, but the preventive sheet A may be attached to structures to be brought into contact with seawater and fresh water, such as a seawater storage tank in a facility using seawater, for example an aquarium, a crude oil suction pipe, a drilling facility provided in an offshore oil field, a transmitting and receiving device of a fish detector, the bottom surface of a ship, an oil or LPG storage tank floating in the sea, an oil fence, a floating buoy provided in a fish farm and a marine buoy, in order to keep off shellfish larvae and to prevent the apposition and the propagation of the shellfishes.

EXAMPLE

Water suction pipes X, Y made of vinyl chloride having a diameter of 150 mm and a length of 1,500 mm were submerged in seawater to a depth of 3 m at 200 m distant offshore from the Sodesode Hama Jyoen at Dojyo-Cho Aza Kosode Shodo-Gun Kagawa-Prefecture in Japan.

The outer surfaces of both the sample pipes were colored with a white paint. The preventive sheet (made of an acrylic fiber) having a white sheet-color according to the present invention was stuck to a portion of the outer surface of the pipe and a portion of the inner surface thereof by use of an adhesive. The preventive sheet had a mink-like appearance and was pressed and stuck after being cut in suitable sizes from its backside on which an adhesive was applied. As an adhesive, Sekisui S-dyn 510-R was used, but WEP having a superior innoxious salt-resistive characteristic may be also used.

Since the peak season for the larvae of a barnacle and an oyster is from May to June, the experiment was started on the 10th of May, 1988 and ended on Oct. 26, 1988, which therefore included August as a breeding season of other kinds of shellfishes the samples X, Y were removed from the sea bottom on Oct. 26, 1988.

The appositional condition of the shellfishes on the samples was observed with the unaided eye because the unaided eye examination is sufficient. As a result of the unaided eye examination, though barnacles and oysters apposed and grew on such portions of the outer surfaces of the pipes not provided with the preventive sheets, no appositions of the shellfishes were observed on such portions of the sample X provided with the preventive sheets.

As expected, it was observed that a few shellfishes such as barnacles apposed on the top surface of the pipe exposed to the sun's rays and much more on the opposite lateral sides. This tends to confirm the notion that shellfishes are supposed to instinctively dislike the ultraviolet-rays of the sun. To the contrary, a great many barnacles apposed and grew thick on the inner top surface of the pipe.

The test for the inner surface of the pipe was carried out together with the blank test. The apposition of the shellfishes was not observed on such places of the inner surfaces of the pipe sample Y provided with the preventive sheet but observed on such portions as not provided with the preventive sheet. In order to observe the inside of the pipe further in detail, the pipe was cut longitudinally and a picture thereof was taken.

The preventive method against apposition of the shellfish can maintain its effectiveness as long as the preventive sheets are not peeled off from predetermined places, and the apposition of the shellfishes can be prevented for along time.

The preventive method according to the present invention is based on the ecological instinct of the shellfish, namely in making good use of the physiological abomination of the shellfish larvae to a dirty, soft, unstable, always swaying object, and to ultraviolet-rays. To the contrary, the larvae by instinct are anxious to physiologically appose to a hard stationary place.

This method is based on the conceptional idea basically different from conventional methods and provides an innoxious nonpolluting lasting inexpensive effective countermeasure against the apposition of the shellfish so long as the base member of the preventive sheet is not peeled off.

Some of the many features and advantages of the present invention should now be apparent. For example, since the preventive sheet is simply stuck to such portions of a structure as to be brought into contact with seawater and freshwater for preventing the apposition of a marine organism such as a shellfish, the attaching work is easy.

Since the present invention makes good use of the physiological abomination of the shellfish larvae against a dirty, soft, unstable, always swaying object for keeping the shellfishes off, the preventive method and sheet are innoxious, nonpolluting and safe.

Since the preventive sheet can be manufactured by the same manufacturing method as an ordinary boa cloth, its productivity is good and it can be manufactured at low cost.

It is understood that the above-mentioned embodiment is only illustrative, and that various modifications and steps may be made by those skilled in the art without departing from the spirit and scope of the invention as claimed.

What is claimed is:

1. A preventive sheet against apposition of marine organisms onto a structure in contact with water, comprising:
   a base member having a front surface and a back surface to be attached to a submerged portion of the structure;

fine fibers thickly provided on the front surface of said base member, said fine fibers being flexible so as to naturally sway in the water even when the structure is in the static condition, said fine fibers having a diameter of 0.01–0.3 mm and a length of 10–30 mm; and magnets dotted on said back surface of said base member.

2. The preventive sheet as defined in claim 1, wherein said fine fibers are raised substantially vertically in a straight fashion to the base member.

3. The preventive sheet as defined in claim 1, wherein said fine fibers contain an ultraviolet-ray absorbent.

4. The preventive sheet as defined in claim 1, wherein said fine fibers are white.

5. The preventive sheet as defined in claim 1, wherein said fine fibers are green.

6. The preventive sheet as defined in claim 1, wherein said base member has a napped surface of polyester cloth.

7. The preventive sheet as defined in claim 1, wherein said base member has a napped surface of polycarbonate cloth.

8. The preventive sheet as defined in claim 1, wherein said base member is backed by rubber.

* * * * *